United States Patent [19]
Holbrook et al.

[11] 3,952,647
[45] Apr. 27, 1976

[54] ROLL FOR EXTRACTING OIL FROM SHAVED FLAVEDO

[75] Inventors: Franklin K. Holbrook, Whittier; Donald R. James, West Covina, both of Calif.

[73] Assignee: Brown International Corporation, Covina, Calif.

[22] Filed: Sept. 13, 1974

[21] Appl. No.: 505,541

Related U.S. Application Data

[63] Continuation-in-part of Ser. No. 398,686, Sept. 19, 1973, abandoned.

[52] U.S. Cl. .............................. 100/98 R; 83/505; 99/509; 100/105; 100/173
[51] Int. Cl.² .......................................... B30B 9/02
[58] Field of Search ................ 100/39, 73, 94, 74, 100/95, 75, 96, 97, 98 R, 105, 173, 174, 175, 176, 215; 29/121 A, 121 H; 83/434, 505; 226/193; 99/509, 595

[56] References Cited
UNITED STATES PATENTS

| 639,436 | 12/1899 | Roberts | 100/97 |
|---|---|---|---|
| 1,108,780 | 8/1914 | Ogg | 100/174 |
| 1,309,015 | 7/1919 | Buchanan | 100/176 |
| 2,004,056 | 6/1935 | Pipkin | 100/174 |
| 2,212,066 | 8/1940 | Fry | 100/39 |
| 2,382,620 | 8/1945 | Eastman | 100/97 |
| 3,070,140 | 12/1962 | James | 100/98 |
| 3,103,239 | 9/1963 | Alexander et al. | 100/105 |
| 3,183,825 | 5/1965 | James | 100/98 R |
| 3,548,742 | 12/1970 | Seufert et al. | 100/95 |

FOREIGN PATENTS OR APPLICATIONS

| 523,579 | 7/1940 | United Kingdom | 83/505 |
|---|---|---|---|
| 559,623 | 7/1958 | Canada | 83/505 |

Primary Examiner—Billy J. Wilhite
Attorney, Agent, or Firm—Lyon & Lyon

[57] ABSTRACT

A metal roll is provided with a series of sharp circular fins extending around its periphery, in the form of separate circular fins separated by shallow angular grooves. The grooved roll, in cooperation with a ribbed roll, pulls citrus peel through a shaving knife which separates the albedo from the flavedo before the latter passes between a bite formed between the grooved roll and a cooperating roller. A stationary wiper formed of ultra high molecular weight polyethylene engages the peripheral fins to scrape off flavedo and peel oil liquor which adheres to them.

3 Claims, 2 Drawing Figures

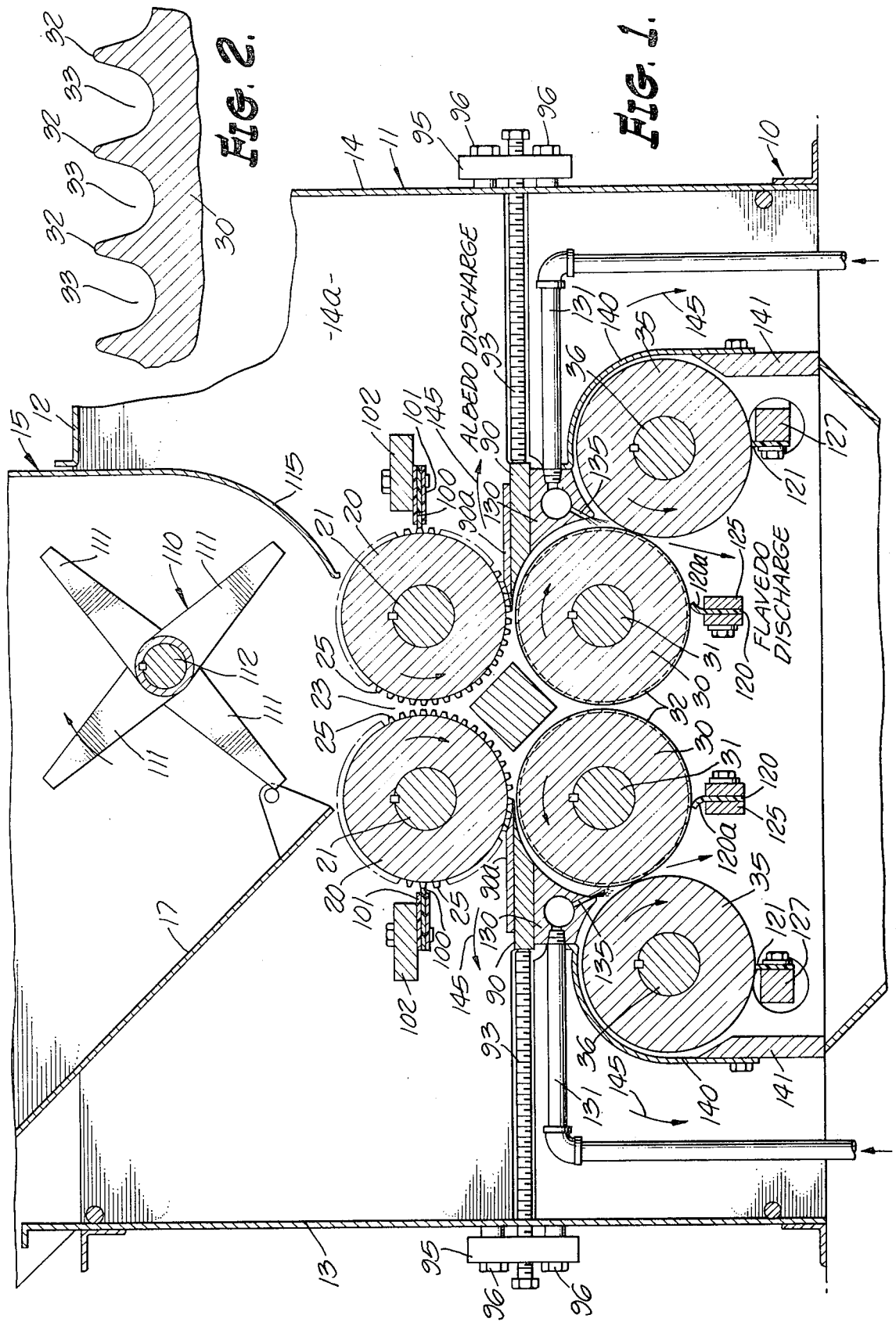

ROLL FOR EXTRACTING OIL FROM SHAVED FLAVEDO

This application is a continuation-in-part of our co-pending application Ser. No. 398,686 filed Sept. 19, 1973 and entitled "Roll for Extracting Oil from Shaved Flavedo", now abandoned.

This invention relates to apparatus for extraction or removal of oil from citrus peel, and constitutes an improvement over the apparatus shown in the James U.S. Pat. No. 3,183,825 granted May 18, 1965. The disclosure of that prior patent is incorporated herein as if fully set forth.

Citrus peel oil and particularly oil extracted from the peel of lemons has found a ready market in recent years and the demand has been increasing. It has been found that the percentage yield of citrus peel oil can be improved by employing a different type of surface on the periphery of one of the rolls of commercial machines constructed in accordance with said prior patent. Instead of employing a combination of knurled and smooth surfaces on certain of the rolls disclosed in that prior patent, it has been found that production of citrus peel oil is improved markedly by employing a series of knife-like fins extending around the periphery of one roll in the form of a series of circular fins separated by shallow annular grooves. The surfaces of the groves aid in pulling the citrus peel through a shaving knife to remove the oil-containing flavedo. The flavedo then enters the bite between a knurled roll and the roll having the knife-like fins.

It has been found that a quality of the citrus peel oil is also improved through the use of such finned rolls because the production of undesirable flavedo constituents is minimized. Such constituents tend to produce a rather viscous emulsion which is difficult to centrifuge with high efficiency.

Other and more detailed objects and advantages will appear hereinafter.

In the drawings:

FIG. 1 is a sectional side elevation showing a machine of the general type of said prior U.S. Pat. No. 3,183,825, but showing the improved finned rolls and wiper blades.

FIG. 2 is a sectional detail showing the form of the knife-like fins on the periphery of certain of the rolls.

Referring to the drawings, the apparatus includes a framework 10 to which is secured a generally rectangular housing 11 having a top wall 12, front and back walls 13 and 14 and side walls 14a. A hopper 15 is secured to the housing and extends down through the top wall 12, the hopper being provided with a pivoted chute wall 17 for cleaning purposes.

Mounted directly below the bottom opening in the hopper is a pair of drums 20, each drum being mounted on a horizontal shaft 21 extending lengthwise of the frame and journalled at each end in suitable bearing members. The drums 20 are mutually parallel and spaced apart to form a narrow bite 23, the normal spacing between the outermost peripheral surfaces of the drums being about 50% of the thickness of the peel to be operated upon. The cylindrical surfaces of the drums are provided with a plurality of circumferentially spaced parallel ribs 25 preferably parallel to the axis of their respective drum as shown. A number of sets of the longitudinally extending ribs are provided, adjacent sets being spaced apart to provide a plurality of circumferential grooves (not shown).

A pair of rolls 30 is mounted directly below the drums 20, each roll 30 being carried on a shaft 31 suitably journalled in bearing members. The rolls 30 are each closely spaced from the adjacent drum 20, the spacing being approximately the same as that between the drums 20. As is apparent from the drawings and the following description, the rolls 30 provide means, cooperating with the drums 20, for guiding the peel gripped by the drums 20 as the peel is diverted in one direction or the other, and for properly positioning the peel for presentation to the knife, described below.

A pair of rollers 35 is provided, each mounted on shaft 36 suitably journalled in bearing members. The rollers 35 have a knurled periphery. In accordance with this invention, the rolls 30 have circular peripheral knife-like fins 32 which are parallel and are spaced by shallow annular grooves 33. The crests of the fins are slightly rounded. Rollers 35 are run with close clearance (approximately 0.015 inch or 3.8 mm) to rolls 30. The drums 20, rolls 30 and rollers 35 are each preferably formed of stainless steel.

Suitable drive means are provided for driving the drums 20, the finned rolls 30, and the knurled rollers 35, which drive means allows for adjustment of the relative positions of these members. The drive means is preferably of the form shown in said U.S. Pat. No. 3,183,825.

Horizontal knife blades 90a are mounted on knife holders 90, one mounted on either side of the assembly, the cutting edge of each blade extending into the discharge portion of the bite between the drums 20 and rolls 30 and nearly to the narrowest portion of the bite. Adjusting screws 93 are employed to move the knife holders 90 with their knife blades 90a. The screws 93 are each threadably engaged in a support block 95 secured to the frame by means of quick release bolts 96 for ready removal of the knife holders and blades for cleaning purposes.

Means are provided for stripping the albedo from the drums 20, and, as shown in the drawings, these means may include a plurality of rigid finger members 100 each of which extends into one of the circumferential grooves on the drums 20. The fingers are part of a pair of comblike members 101, one mounted on a frame member 102 on either side of the pair of drums 20. An agitator mechanism 110 includes a plurality of paddle-like members 111 extending radially outward from the shaft 112. The mechanism 110 is rotated at a speed somewhat less than that of the drum 20, preferably in the direction of the arrows of FIG. 1. Means are provided for wiping the surfaces of the finned rolls 30 and knurled rollers 35 clean of peel, oil and juice particles, and, as shown, these means comprise the flexible wiper blades 120 carried on cross-members 125 which are secured to the frame, and the blades 121 carried on cross-members 127. The flexible wiper blades 120 are preferably formed of ultra high molecular weight polyethylene and are initially flat. They have their extending ends resiliently bent or curved as shown at 120a in a direction opposite to the motion of the roll for resilient contact with the fins 32. The sharp fins 32 cut into and wear away the contacting edge of the wiper blade to form wedge shaped grooves therein, so that the contacting edge of the wiper blade closely conforms to the cross-section shape of the roll fins to perform an improved wiping function.

The surfaces which form the sides of the fins 32 and connecting annular grooves 33 are formed by special machining techniques to provide maximum smoothness, followed by hard chrome plating, thereby minimizing wear on the wiper blades 120.

Means are provided for washing flavedo portions as they are pressed between the finned rolls 30 and knurled rollers 35, and, as shown on the drawings, these means may include a pair of water manifold members 130 extending across the apparatus, one under each of the knife blades, a water inlet pipe 131 being connected to each manifold. A plurality of spaced bores 135 extend from the interior of the manifold to direct streams or sprays of water to the bite between the rolls 30 and rollers 35.

The flavedo and albedo discharge portions of the apparatus are separated by means of a pair of curved divider plates 140 extending from the manifold 130 to the vertical frame members 141.

In the use of the apparatus of this invention, citrus fruits, such as lemons, oranges or grapefruit, are cut into halves, the juice and pulp extracted therefrom in any convenient manner, such as in a suitable citrus juice extracting machine. Sections of peel which have been flattened or partially flattened and which have been quartered or cut into other type segments are fed into the hopper 15. The peel segments slide down the chute 17 and are drawn into the bite 23, the albedo portions thereof being impaled by the ribs 25 of the particular drums faced by the albedo. The peel segments are gripped between the cleated drums 20 and the finned rolls 30 are conveyed toward a knife blade 90a which cleanly separates the peel along a plane parallel to the upper and lower surfaces thereof, thus separating the peel into the flavedo layer and the albedo layer.

The albedo is carried outwardly over the top of the knife blades 90a and then downward to discharge in a direction of the arrows 145. The flavedo layers, which contain the valuable peel oil, pass through the passages between the finned rolls 30 and the manifold members 130 and thence into the bites between the finned rolls 30 and the knurled rollers 35 where they are pressed, rupturing the oil cells and releasing the peel oil therefrom. The areas in which these pressing or crushing operations are carried out are continuously sprayed with water from the bores 135, to condense and capture the volatile oil fractions, as well as to wash the oil from the rollers and into the flavedo discharge. The oil, water and pressed flavedo are then separated in any convenient means, such as by first removing the solids in a paddle finisher, and then separating the peel oil from the water in a centrifuge.

In a commercial form of this invention, the finished rolls 30, approximately 4 3/16 inches (106 mm) in diameter, have parallel circular fins 32 on the periphery spaced 0.042 inch (1.07 mm) apart, each fin having an axial width of 0.002 inch to 0.005 inch (0.051 mm to 0.127 mm) at the periphery. The flanks of each thread define a 30° angle between them. The radius of the groove 33 between fins is preferably .013 inch to .017 inch (.33 mm to .43 mm). Coarser pitches, blunter edges and larger angles do not extract as high a percentage of available peel oil without excessive pressure, which pressure also extracts undesirable constituents from the flavedo.

Having fully described our invention, it is to be understood that we are not to be limited to the details herein set forth but that our invention is of the full scope of the appended claims.

We claim:

1. In a device for extracting oil from the peel of citrus fruit, the device including a metallic roll cooperating with a cleated drum and a knife to separate the albedo from the flavedo of the citrus peel, the roll also cooperating with a knurled roller to extract oil from the flavedo, the improvement comprising: a series of circumferential closely spaced sharp, knife-like, circular fins on the periphery of the roll cooperating with the knurled roller to puncture oil cells in the flavedo, said fins having smooth flanks connected by smooth annular grooves, and a flexible non-metallic stationary wiper blade having an edge in resilient contact with said fins.

2. The combination set forth in claim 1 wherein said wiper blade has a portion adjacent said contacting edge which is curved in a direction opposite to the direction of motion of the contacted portion of the finned roll.

3. The combination set forth in claim 1 in which the diameter of the finned roll is about 100 times the lateral spacing of the fins, the width of the fins at the periphery being about 1/20 to 1/10 of their lateral spacing.

* * * * *